United States Patent [19]
Yang

[11] Patent Number: 5,163,539
[45] Date of Patent: Nov. 17, 1992

[54] LUGGAGE ROLLER

[76] Inventor: Fu-Hsiung Yang, No. 11, Alley 7, Lane 148 Chung-Shan Road, Section 2, Pan-Chiao City, Taiwan

[21] Appl. No.: 833,702

[22] Filed: Feb. 11, 1992

[51] Int. Cl.$^5$ .................. B60B 33/00; A47B 91/00
[52] U.S. Cl. .................. 190/18 A; 16/18 CG; 16/45
[58] Field of Search .................. 190/18 A; 16/18 CG, 16/45, 47

[56] References Cited

U.S. PATENT DOCUMENTS

| | | | |
|---|---|---|---|
| 1,153,838 | 9/1915 | Bower et al. | 16/18 CG |
| 2,981,969 | 5/1961 | Fontana | 16/18 CG |
| 3,399,421 | 9/1968 | Crawford | 16/18 CG |
| 4,321,727 | 3/1982 | Sheiman et al. | 16/45 |
| 4,422,212 | 12/1983 | Sheiman et al. | 190/18 A |
| 4,649,595 | 3/1987 | Shane | 16/18 CG |

FOREIGN PATENT DOCUMENTS

| | | | |
|---|---|---|---|
| 1323280 | 2/1963 | France | 16/18 CG |
| 2022997 | 12/1979 | United Kingdom | 190/18 A |

Primary Examiner—Gary E. Elkins
Attorney, Agent, or Firm—D. Peter Hochberg; Mark Kusner; Louis J. Weisz

[57] ABSTRACT

An easily detachable and/or assembleable and/or long-standingly endurable luggage roller is provided. The roller includes a top plate mounting, or rotatably mounting, thereunder a hollow mounting medium having two dovetail-shaped wings having a lower width larger than an upper width, a shaft passing through the two wings for rotatably mounting a rolling medium in the hollow mounting medium, and two decorating pieces respectively engaging with two wings.

5 Claims, 5 Drawing Sheets

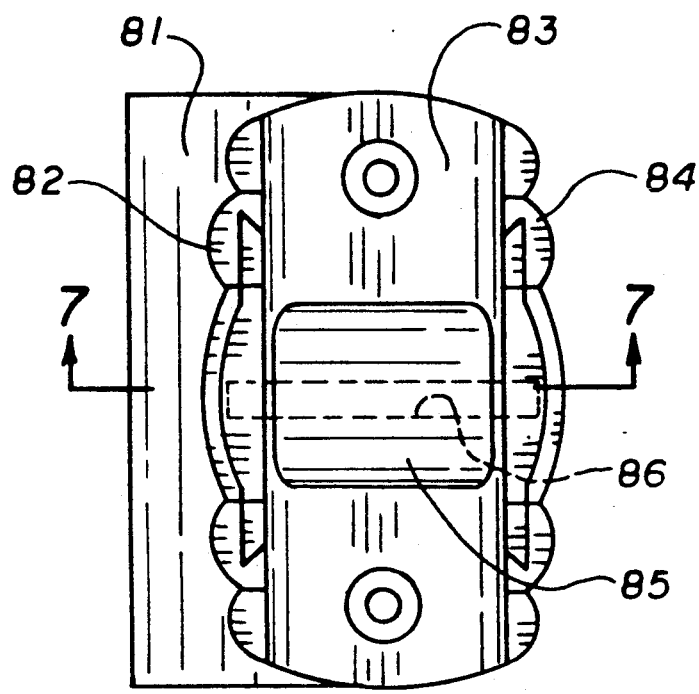
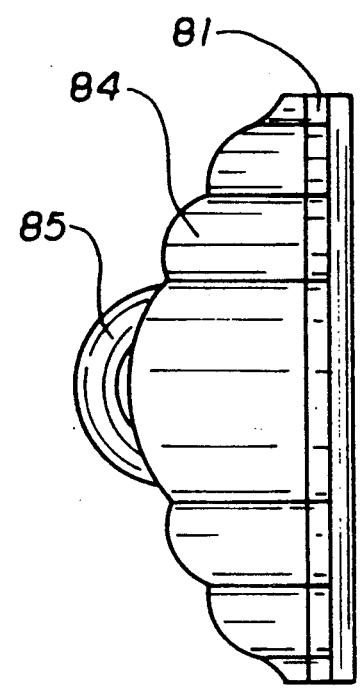
FIG. 5  FIG. 6
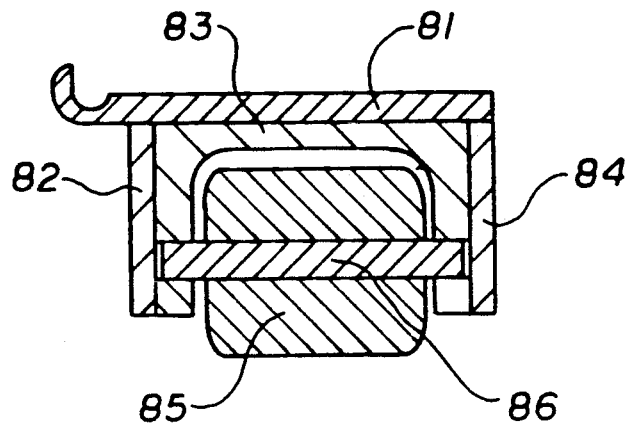
FIG. 7

LUGGAGE ROLLER

BACKGROUND OF THE INVENTION

The present invention relates to a luggage, and more particularly to a roller therefor.

A hard sheet of plastic or the like is generally sandwiched or mounted on the corner, the upper portion and/or the bottom portion of a luggage in order to retain a particular shape therefor, and always rivetedly or otherwise attaches thereunder 4 rollers. The conventional roller always includes a metallic shaft mounting and a plastic roller. In a former period of loading, the roller can restore to its original shape after unloaded. In a latter period, however, the clearance between the shaft mounting and the roller is getting smaller and smaller so that a frictional contact therebetween is finally found. Since the metallic shaft mounting is harder than the plastic roller, an uneven loading on the roller will cause the shaft mounting to cut off the roller piece by piece to finally disable the roller from normally functioning.

It is therefore tried by the Applicant to deal with the above situation encountered by the prior art.

It is therefore an object of the present invention to provide a longstandingly endurable luggage roller.

According to the present invention, a luggage roller includes a top plate to be held attached to a luggage, a hollow mounting medium mounted, or rotatably mounted, under the top plate and having two wings each of which is cross-sectionally dovetail-shaped and has a lower portion having a width larger than that of an upper portion, a shaft penetrating the two wings for rotatably mounting in the hollow mounting medium a rolling medium capable of rolling on a ground surface, and two decorating pieces respectively engaging with the two wings.

The present invention may best be understood through the following description with reference to the accompanying drawings.

BRIEF DESCRIPTION OF THE DRAWING

FIG. 5 is a bottom view showing another preferred embodiment of a luggage roller according to the present invention;

FIG. 6 is a side view showing a luggage roller in FIG. 5;

FIG. 7 is a sectional view taken along the line 7—7 in FIG. 5;

DETAILED DESCRIPTION OF THE PREFERRED EMBODIMENT

Figure 1:
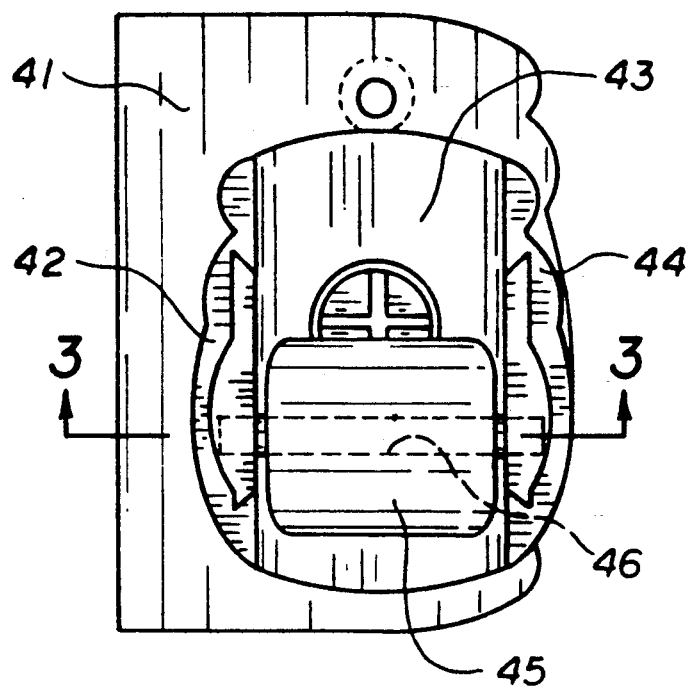
FIG. 1 is a bottom view showing a preferred embodiment of a luggage roller according to the present invention.
Figure 2:
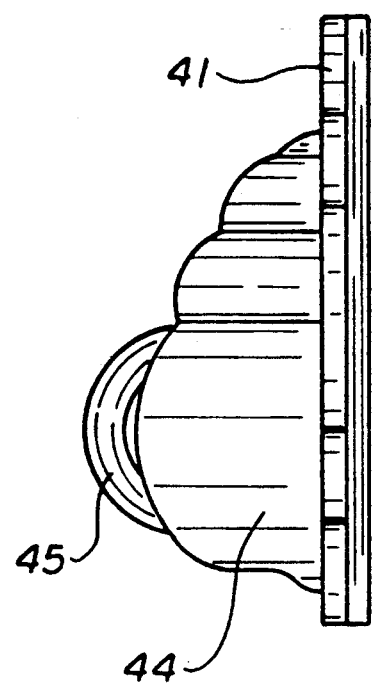
FIG. 2 is a side view showing a luggage roller in FIG. 1.
Figure 3:
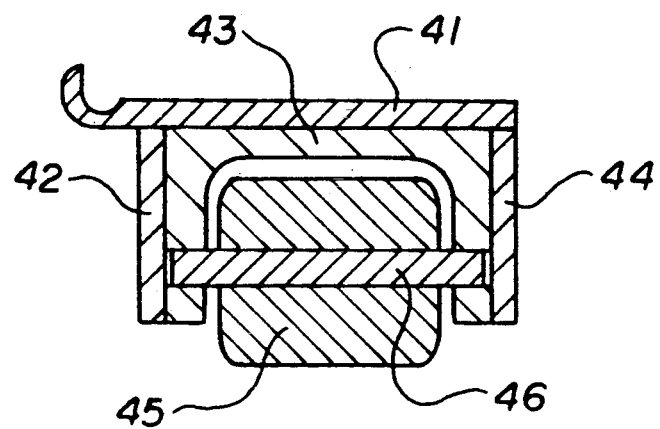
FIG. 3 is a sectional view taken along the line 3—3 in FIG. 1.
Figure 4:
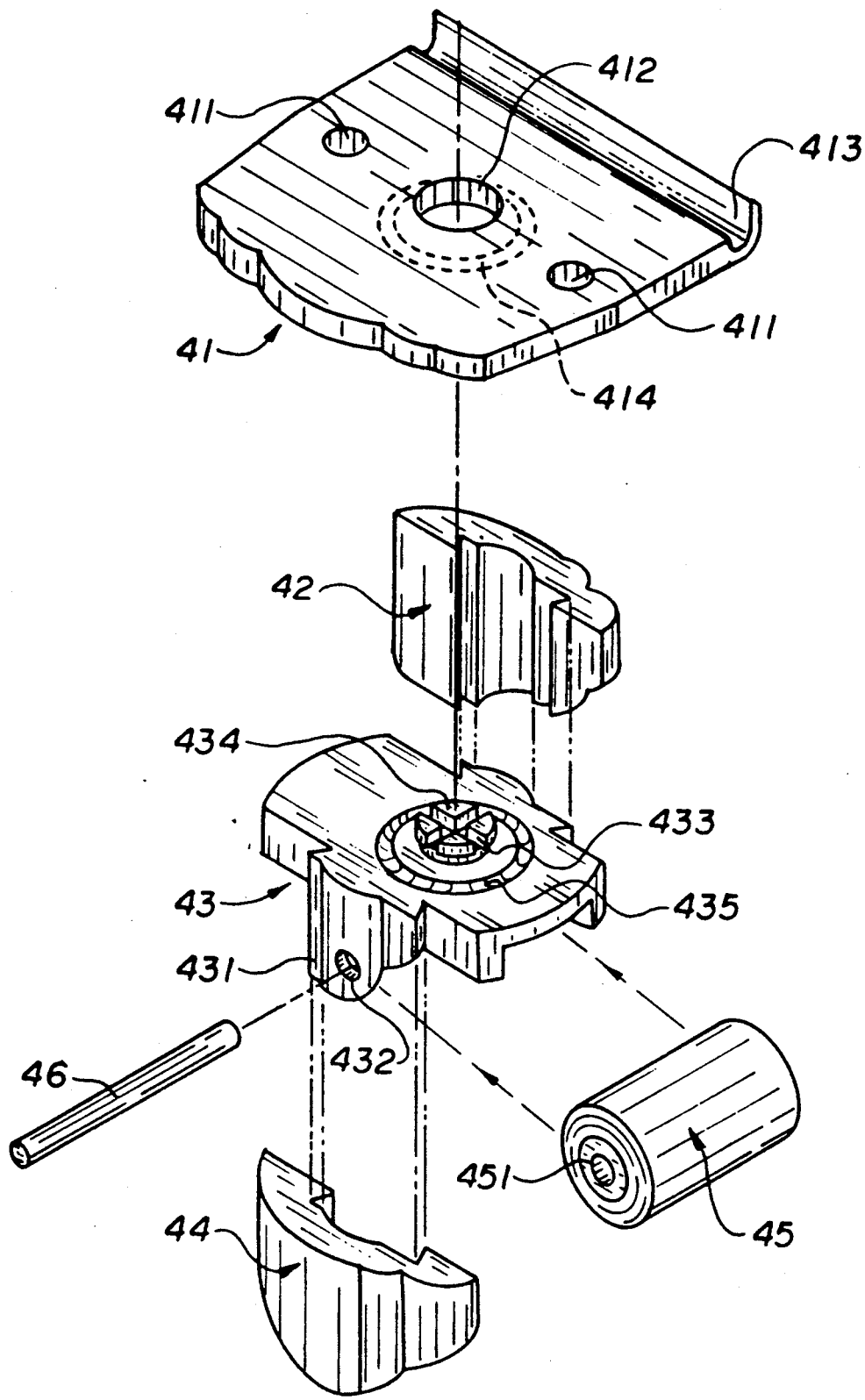
FIG. 4 is an exploded view showing a luggage roller in FIG. 1.
Figure 8:
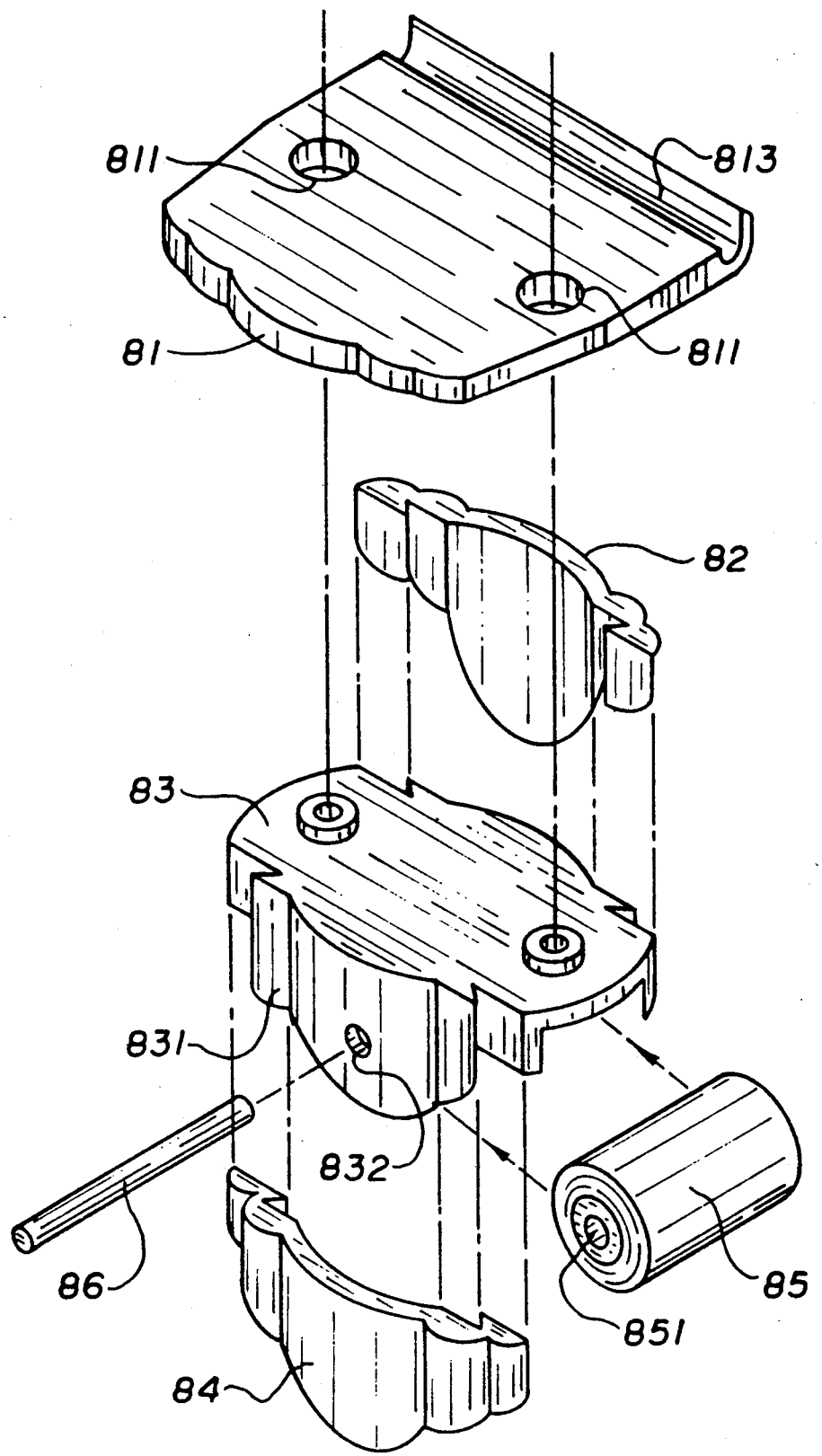
FIG. 8 is an exploded view showing a luggage roller in FIG. 5.

Referring now to FIGS. 1 to 4, there is shown a luggage roller according to the present invention which includes a top plate 41 to be held attached to a luggage, a hollow mounting medium 43, two decorating pieces 42 and 44, a rolling medium 45 having a through hole 451 and capable of rolling on a ground surface, and a shaft 46 all of which can be made of the same material, e.g., nylon or engineering plastic. Top plate 41 being generally quadrangular has a wavy side, an opposite raised side having a longitudinal side groove 413, a central mounting hole 412 having two different diameters, and two end holes 411 through which top plate 41 can be rivetedly or otherwise attached to the luggage.

Hollow mounting medium 43 rotatably mounted under top plate 41 has two opposite wavy wings each of which is generally cross-sectionally dovetail-shaped and has a hole 432 and a lower portion 431 having a width larger than that of a higher portion. Shaft 46 penetrates the two wings (or holes 432) and rolling medium 45 for rotatably mounting rolling medium 45 in mounting medium 43. Decorating pieces 42 and 44 respectively engage therein the two wings of mounting medium 43 for additionally confining therebetween shaft 46.

Hollow mounting medium 43 further includes a top protrusion 434 being rotatably mounted in mounting hole 412, and a circular indentation 435 coaxial to protrusion 434 and engageable with a bottom circular protrusion 414 coaxial to mounting hole 412 on top plate 41. Top protrusion 434 has a cross-shaped groove 433 and two different diameters so that it can pass through and engage in mounting hole 412.

FIGS. 5 to 8 show another preferred embodiment of a luggage roller according to the present invention which includes a top plate 81 having two end holes 811 and a longitudinal side groove 813, a hollow mounting medium 83 having two wings having holes 832 and wider lower portions 831, a rolling medium 85 having a through hole 851, a shaft 86, and two decorating pieces 82 and 84 all of which are correspondingly similar to those of the luggage roller shown in FIGS. 1 to 4. However, hollow mounting medium 83 and top plate 81 can be rivetedly or otherwise attached to the luggage through end holes 811.

Figure 9:
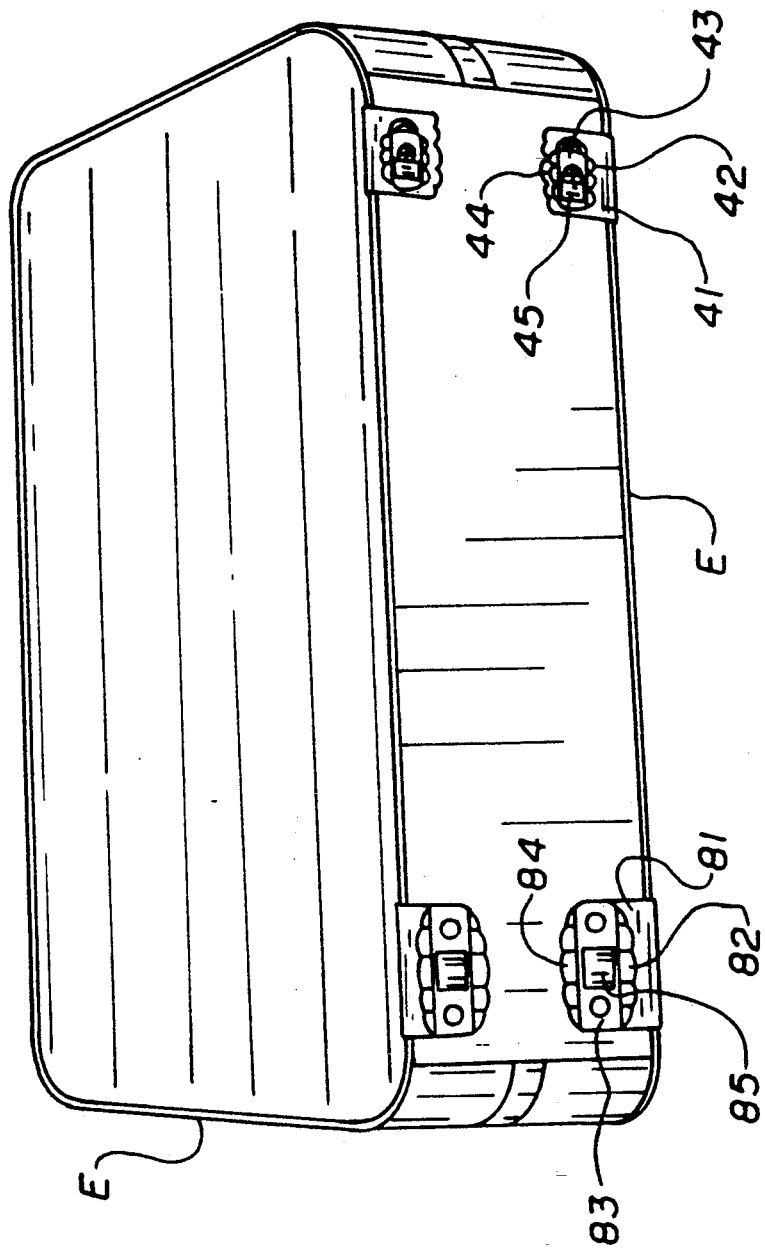
FIG. 9 is a perspective view showing a luggage incorporating thereon the roller according to the present invention.

As shown in FIG. 9, the luggage roller shown in FIGS. 1 to 4 can preferably be a front roller as hollow mounting medium 43 is rotatably mounted and hence the rolling direction may be easily changed, and the roller shown in FIGS. 5 to 8 can preferably be a rear roller as hollow mounting medium 83 is not rotatably mounted and hence the rolling direction can be easily retained. The side groove 413 (813) of top plate 41 (81) can match therein a ridging edge E of the luggage to improve the neatness of the luggage.

It should now become apparent how and why the present invention can achieve the objects it contemplates. It is to be noticed that various modifications can be made to the above preferred embodiments without departing from the spirit of the protecting scope of the appended claims.

What I claim is:

1. A luggage roller comprising:
   a top plate adapted to be held attached to a luggage;
   a hollow mounting medium mounted under said top plate, and having two wings each of which is generally cross-sectionally dovetailshaped and has a lower portion having a width larger than that of a higher portion;

a rolling medium capable of rolling on a ground surface;

a shaft penetrating said two wings and said rolling medium for rotatably mounting said rolling medium in said hollow mounting medium; and two decorating pieces respectively engaging with said two wings.

2. A luggage roller according to claim 1 wherein said top plate and said hollow mounting medium are non-metallic.

3. A luggage roller according to claim 1 wherein said luggage has a ridging edge and said top plate has a corresponding side groove capable of matching therein said ridging edge.

4. A luggage roller according to claim 1 wherein said top plate has a mounting hole having two different diameters and said hollow mounting medium has a top protrusion which has a cross-shaped groove and two different diameters and is rotatably mounted in said mounting hole.

5. A luggage roller according to claim 4, further comprising a circular indentation and a corresponding circular protrusion being interengageable and respectively coaxial to said top protrusion and said mounting hole and provided on said hollow mounting medium and said top plate.

* * * * *